UNITED STATES PATENT OFFICE.

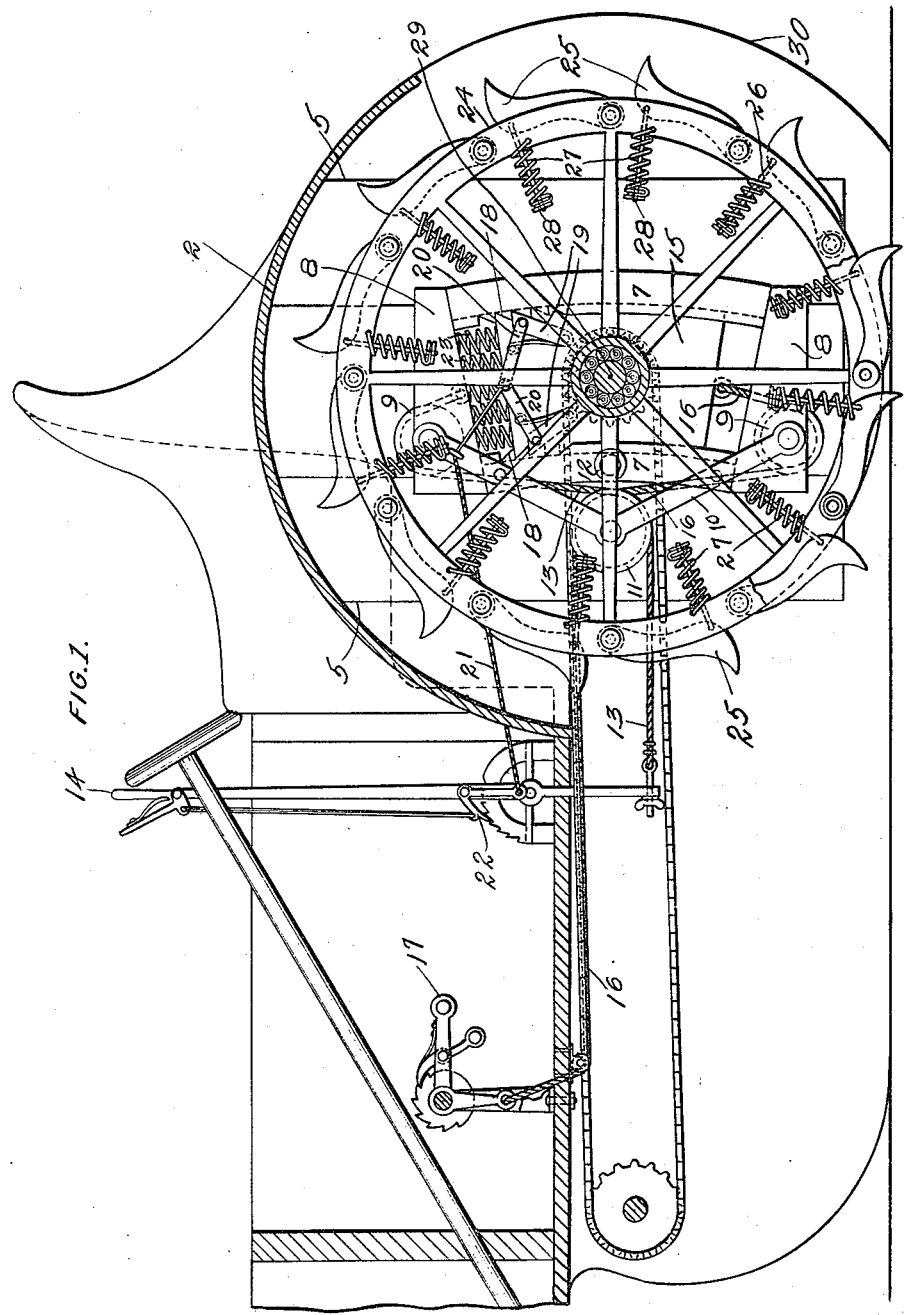

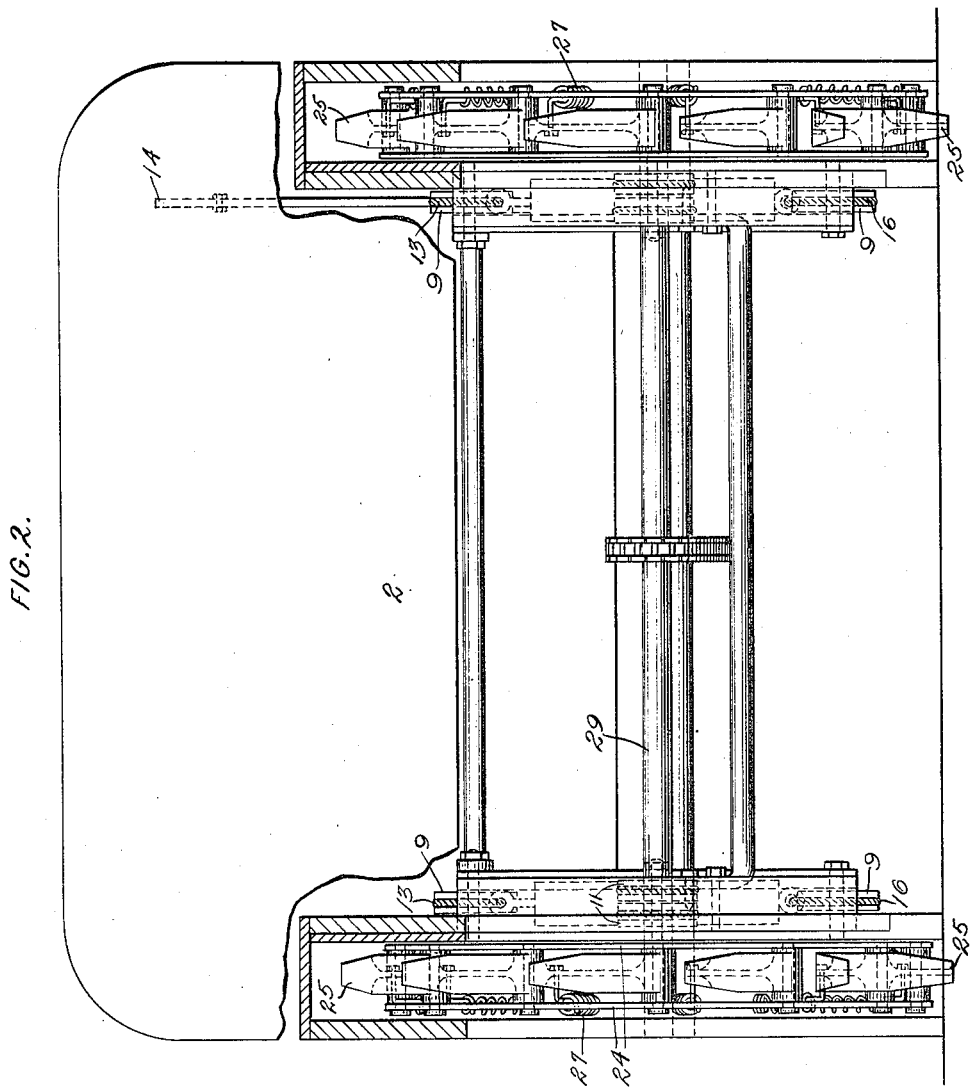

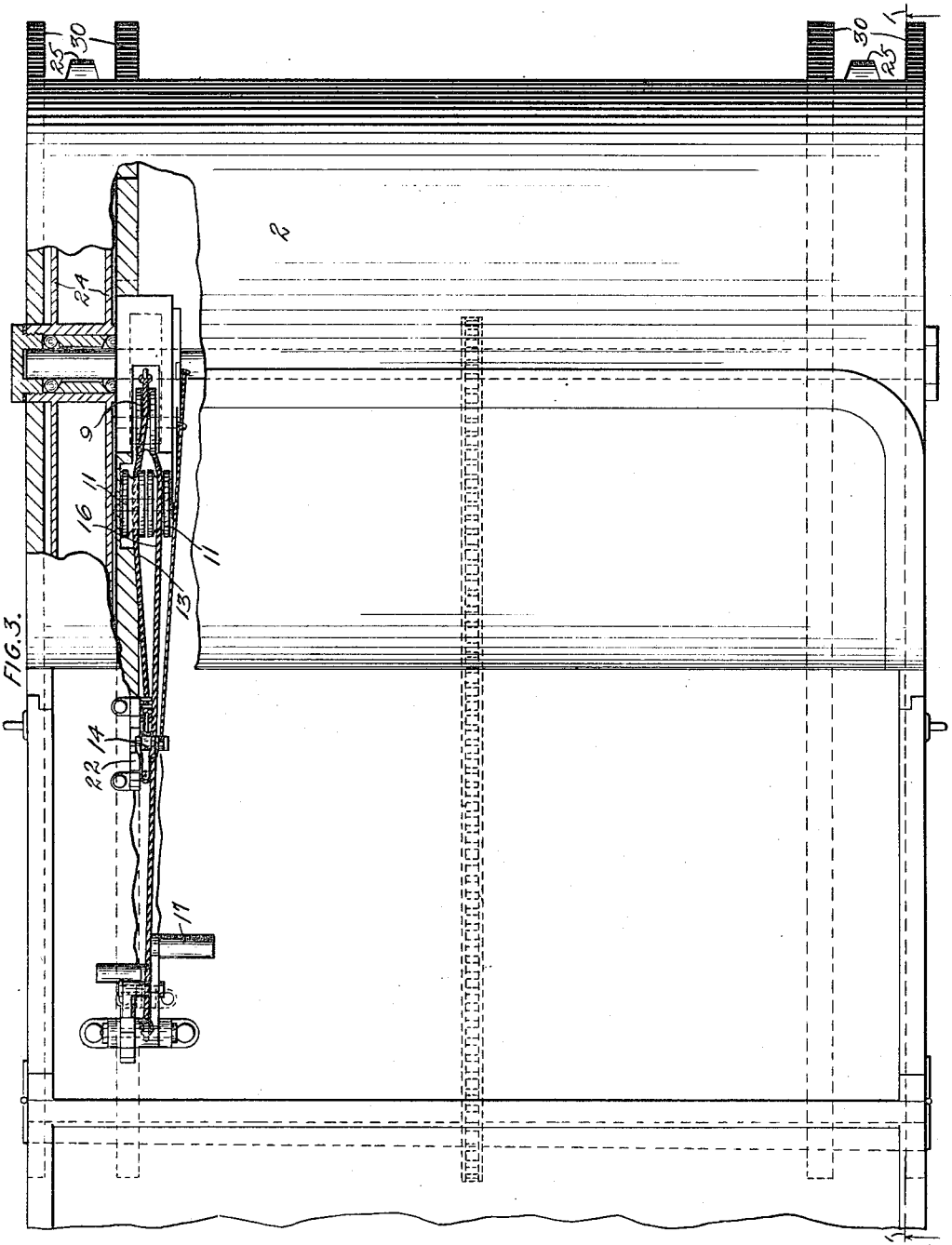

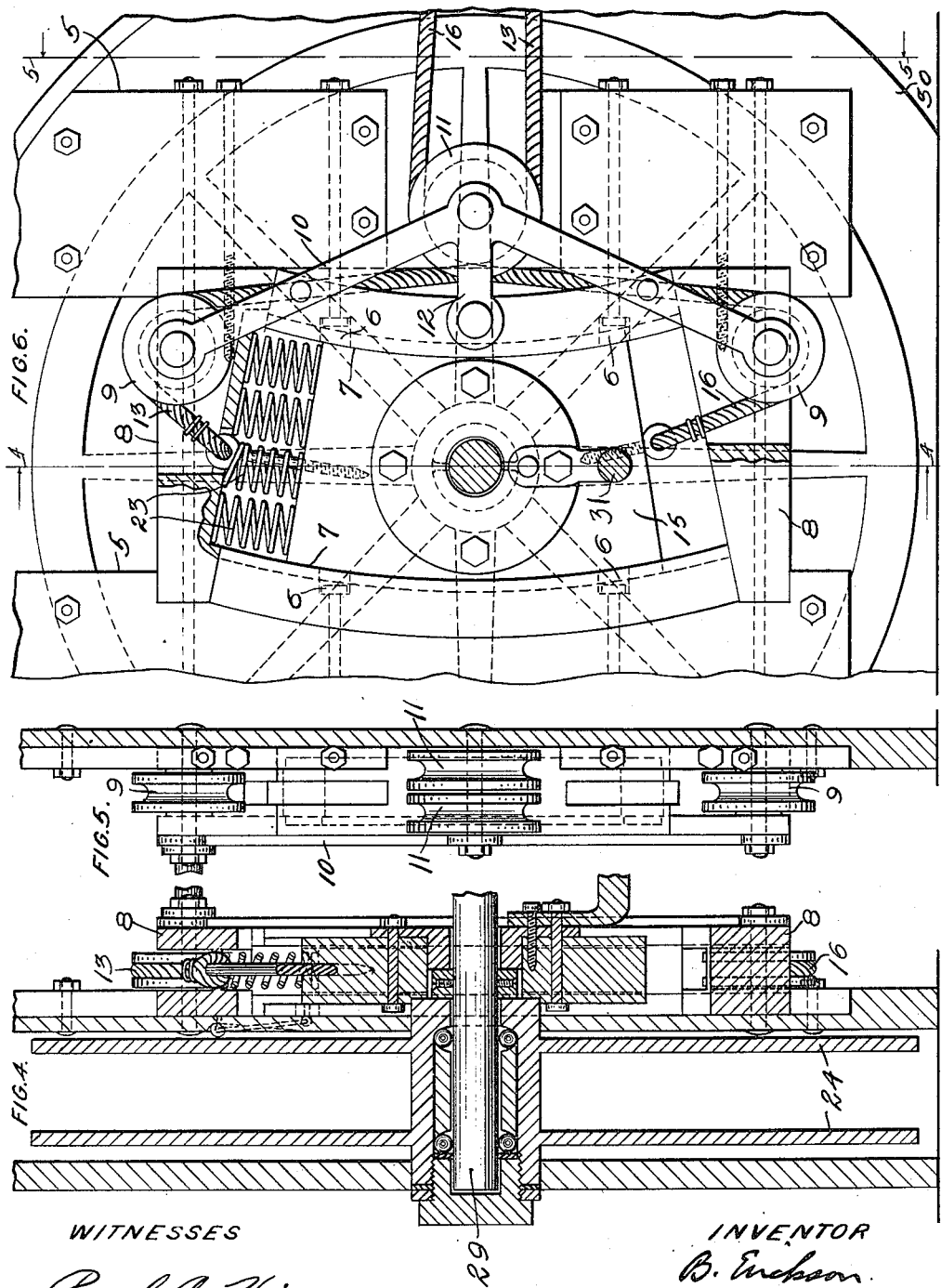

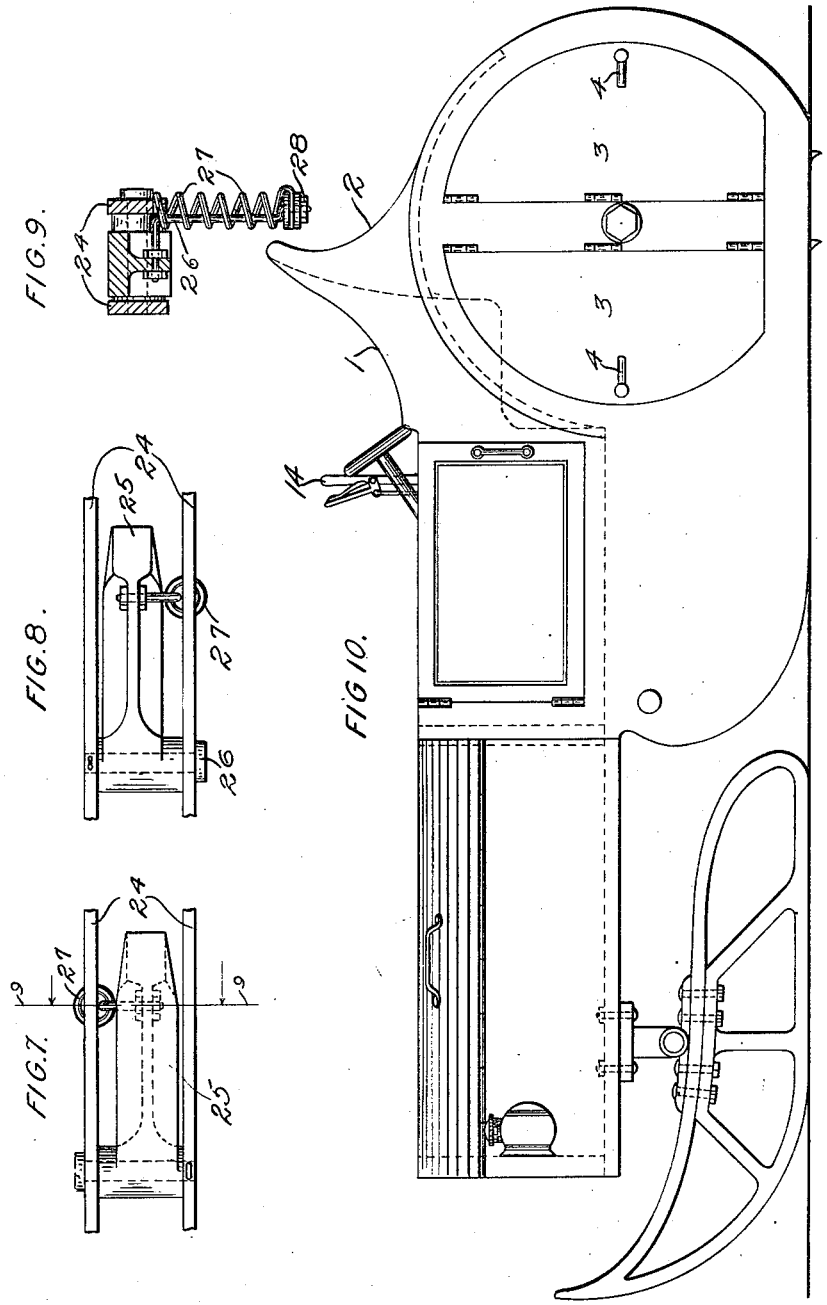

BENJAMIN ERICKSON, OF MAPLETON, MICHIGAN.

AUTOMOBILE SLEIGH.

1,156,069.

Specification of Letters Patent.

Patented Oct. 12, 1915.

Application filed October 14, 1912. Serial No. 725,672.

*To all whom it may concern:*

Be it known that I, BENJAMIN ERICKSON, a citizen of Sweden, residing at Mapleton, in the county of Multnomah and State of Michigan, have invented certain new and useful Improvements in Automobile Sleighs, of which the following is a specification.

This invention relates to improvements in automobile sleighs and its object is to produce a device of this class that can be instantly changed from a wheeled vehicle to a sled to enable it to travel over snow and ice or dirt roads. The drive wheels of the device are made with a double rim in which a plurality of pivotally secured spring-pressed friction shoes are disposed and means for raising and lowering the said wheels vertically are provided and for locking them in an adjusted position thus enabling the vehicle to travel with ease over a road covered with a light or heavy fall of snow or ice.

With the foregoing and other objects in view the invention consists in the combination and arrangement of parts to be hereinafter fully described in the following specification, pointed out in the claims and illustrated in the accompanying drawings which form a part of the specification and in which—

Figure 1 is a section in side elevation of my improved automobile sleigh and it is taken on line 1—1 of Fig. 3. Fig. 2 is a rear elevation of the machine with the housing removed. Fig. 3 is a plan partly in section. Fig. 4 is a section taken on line 4—4 of Fig. 6. Fig. 5 is a section taken on line 5—5 of Fig. 6 showing the pulley arrangement. Fig. 6 is a side elevation of one of the drive wheels showing the opposite side to that shown in Fig. 1. Fig. 7 is a plan of the spring-pressed shoe employed. Fig. 8 is an inverted view of the same. Fig. 9 is a section taken on line 9—9 of Fig. 7. Fig. 10 is a side elevation of the complete machine.

Like reference characters indicate corresponding parts throughout the several views.

1 is the automobile sleigh to the rear portion of which a housing 2 is secured that incloses the driving mechanism and all of the improvements embodied in the machine and that is provided with hinged doors 3—3 which may be opened by handles 4—4 to examine the working parts. To either side of the housing and within the same, oppositely disposed vertically positioned supports 5 are secured to which are bolted, as at 6, curved guides 7—7 which are provided at either end with terminal blocks 8—8 in which pulleys 9—9 are journaled that are connected by a brace 10 wherein a double pulley 11 is disposed and which brace is supported by a link 12 secured to one side of the curved guide 7. A cable 13 is connected to a lever 14 secured to the machine 1 and passes over one portion of the double pulley 11 and over the upper pulley 9 and through the terminal block and is connected to a sliding block 15 disposed and operable between the curved guides 7—7. To the lower end of the sliding block 15 a cord 16 is secured which passes through the lower terminal block 8 and over the lower pulley 9 and over one section of the double pulley 11 and is connected to a foot lever 17 secured to the floor of the machine.

Racks 18, 18 formed in the relatively adjacent faces of the curved guides 7, 7 are adapted for coöperation with dogs 19, 19 secured to a spring-pressed lever 20 which is connected by a cable 21 to a pawl 22 carried by the lever 14. Springs 23 secured to the upper terminal block 8 and to the sliding block 15 act as shock absorbers as the said sliding block is adjusted. The rim 24 of each drive wheel of the machine is bifurcated and within the bifurcated rim a plurality of friction shoes 25 are pivoted each of which carries a pin 26 having disposed thereupon a spring 27 abutting the said rim and a washer 28 carried at the free termination of said pin. The axle 29 of the wheel whose rim is 24 is journaled in the sliding block 15 and movable in a vertical plane therewith. My vehicle is provided with suitable runners 30. When it is desired to use the vehicle as a sleigh the drive wheels are raised vertically until they are just off the ground thus permitting the machine to rest upon its runners; this is accomplished by moving the lever 14 toward the back of the machine which will cause the cable 13 to pull up on the lever 20 and draw the dogs 19 out of engagement with the racks 18 and at the same time the foot lever 17 is raised thus permitting the cable 16 to slacken and permit the ascent of the said blocks with the drive wheels. To lower the drive wheels the operation just described is reversed.

During either operation the shock absorbers 23 will take up any jar incident to this adjustment. Over a road devoid of ice and snow the drive wheels will be lowered until they run upon the ground and displace the rear runners and at all times great propelling power is afforded by contact of the pivoted friction shoes with the road. Connecting rods 31 connect the oppositely disposed sliding blocks 15 to enable them to work in unison.

What is claimed is:—

1. In an automobile sleigh comprising a housing, secured to one end of the machine, vertically disposed supports secured within said housing, curved guides carried by said supports, sliding blocks adjustably disposed within said curved guides, manually operable means carried by the machine for actuating said sliding blocks, drive wheels provided with bifurcated rims and with an axle journaled in the said sliding blocks and movable vertically therewith and spring-pressed friction shoes pivotally secured within said bifurcated rim.

2. In an automobile sleigh comprising a housing, secured to one end of the machine, vertically disposed supports secured within said housing, curved guides carried by said supports, sliding blocks adjustably disposed between said curved guides, manually operable means carried by the machine for actuating said sliding blocks, shock absorbers for said sliding blocks, drive wheels provided with bifurcated rims and with an axle journaled in the said sliding blocks and movable vertically therewith and spring-pressed friction shoes pivotally secured within said bifurcated rim.

3. In an automobile sleigh comprising a housing, secured to one end of the machine, vertically disposed supports secured within said housing, curved guides carried by said supports, sliding blocks adjustably disposed between said curved guides, terminal blocks connecting said curved guides, shock absorbers disposed between said terminal blocks and the said sliding blocks, manually operable means carried by the machine for actuating said sliding blocks, drive wheels provided with bifurcated rims and with an axle journaled in the said sliding blocks and movable vertically therewith and spring-pressed friction shoes pivotally secured within said bifurcated rim.

In testimony that I claim the foregoing as my own I have hereto affixed my signature in the presence of two subscribing witnesses.

BENJAMIN ERICKSON.

Witnesses:
 ANDREW PETERSON,
 HANNAH PETERSON.